US009575938B2

(12) United States Patent
Bastide et al.

(10) Patent No.: US 9,575,938 B2
(45) Date of Patent: Feb. 21, 2017

(54) REAL-TIME SHARED WEB BROWSING AMONG SOCIAL NETWORK CONTACTS

(71) Applicant: International Business Machines Corporation, Armonk, NY (US)

(72) Inventors: Paul R. Bastide, Boxford, MA (US); Lisa Seacat DeLuca, Baltimore, MD (US); Lydia M. Do, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/059,574

(22) Filed: Mar. 3, 2016

(65) Prior Publication Data

US 2016/0188735 A1 Jun. 30, 2016

Related U.S. Application Data

(63) Continuation of application No. 13/958,540, filed on Aug. 3, 2013, now Pat. No. 9,305,094.

(51) Int. Cl.
*G06F 17/30* (2006.01)
*G06F 17/22* (2006.01)
(Continued)

(52) U.S. Cl.
CPC ......... *G06F 17/2235* (2013.01); *G06F 17/241* (2013.01); *G06F 17/3089* (2013.01);
(Continued)

(58) Field of Classification Search
CPC ............ G06F 17/30867; G06F 17/30554; G06F 17/3089; G06F 17/2235; G06F 17/241; G06F 17/30719; G06F 17/30864; H04L 51/32; H04L 51/046; H04L 65/403; H04L 67/02; G06Q 10/101; G06Q 50/01
See application file for complete search history.

(56) References Cited

U.S. PATENT DOCUMENTS 7,890,501 B2 * 2/2011 Lunt .................. G06F 17/30864
707/722
2008/0082509 A1 4/2008 Bessieres et al.
(Continued)

OTHER PUBLICATIONS

Ian Paul, Microsoft Bing Social vs. Google Search Plus Your World: Showdown, Online article: PCWorld, May 11, 2012, pp. 1-4, PCWorld.com, Published at: http://www.pcworld.com/article/255476/microsoft_bing_social_vs_google_search_plus_your world_showdown.html.
(Continued)

*Primary Examiner* — Apu Mofiz
*Assistant Examiner* — Jared Bibbee
(74) *Attorney, Agent, or Firm* — Lee Law, PLLC; Christopher B. Lee

(57) ABSTRACT

A determination is made that each of at least two social network contacts involved in a social messaging interaction initiate a separate web search associated with the social messaging interaction. A separate set of web search results returned to each of the at least two social network contacts is captured in association with each initiated separate web search. A combined live search results view that includes each captured separate set of web search results is provided to each of the at least two social network contacts. The combined live search results view provides navigation to web content returned to other social network contacts.

12 Claims, 9 Drawing Sheets

(51) Int. Cl.
*H04L 12/58* (2006.01)
*H04L 29/06* (2006.01)
*G06Q 50/00* (2012.01)
*G06F 17/24* (2006.01)
*H04L 29/08* (2006.01)
*G06Q 10/10* (2012.01)

(52) U.S. Cl.
CPC .. *G06F 17/30554* (2013.01); *G06F 17/30719* (2013.01); *G06F 17/30864* (2013.01); *G06F 17/30867* (2013.01); *G06Q 10/101* (2013.01); *G06Q 50/01* (2013.01); *H04L 51/046* (2013.01); *H04L 51/32* (2013.01); *H04L 65/403* (2013.01); *H04L 67/02* (2013.01)

(56) References Cited

U.S. PATENT DOCUMENTS

| | | | |
|---|---|---|---|
| 2009/0271368 | A1 | 10/2009 | Channell |
| 2010/0058202 | A1* | 3/2010 | Rostom ............. G06F 17/30864 715/758 |
| 2011/0087661 | A1 | 4/2011 | Battisha et al. |
| 2012/0066202 | A1* | 3/2012 | Hatazawa ......... G06F 17/30864 707/710 |
| 2012/0158720 | A1* | 6/2012 | Luan ................. G06F 17/30867 707/732 |
| 2012/0317097 | A1* | 12/2012 | Tseng ................ G06F 17/30864 707/722 |
| 2014/0136505 | A1* | 5/2014 | Satalkar ............ G06F 17/30864 707/706 |

OTHER PUBLICATIONS

Jared Newman, Bing's Social Search: A Hands-On Tour, Online article: PCWorld, May 16, 2012, pp. 1-3, PCWorld.com, Published at: http://www.pcworld.com/article/255669/bings_social_search_a_handson_tour.html.

Ian Paul, 5 Ways to Use Google's Search Plus Your World, Online article: PCWorld, Jan. 13, 2012, pp. 1-3, PCWorld.com, Published at: http://www.pcworld.com/article/248135/5_ways_to_use_googles_search_plus_your_world.html?tk=rel_news.

Emil Tin, Social Editing, Webpage/site, Printed from website on Aug. 2, 2013, p. 1, TheSocialLab.dk, Published at: http://thesociallab.dk/challenges/8/ideas/254.

Author Unknown, Google Drive: Create and collaborate, Webpage/site, Printed from website on Aug. 2, 2013, pp. 1-5, Google.com, Published at: http://www.google.com/google-d-s/documents/index.html.

United States Patent and Trademark Office, Office Action for U.S. Appl. No. 13/958,540, Aug. 28, 2015, pp. 1-20, Alexandria, VA, USA.

United States Patent and Trademark Office, Miscellaneous Communication to provide corrected Form PTO-892 for U.S. Appl. No. 13/958,540, Sep. 2, 2015, pp. 1-3, Alexandria, VA, USA.

United States Patent and Trademark Office, Notice of Allowance for U.S. Appl. No. 13/958,540, Jan. 4, 2016, pp. 1-12, Alexandria, VA, USA.

United States Patent and Trademark Office, Office Action for U.S. Appl. No. 13/961,444, Aug. 27, 2015, pp. 1-16, Alexandria, VA, USA.

United States Patent and Trademark Office, Miscellaneous Communication to provide corrected Form PTO-892 for U.S. Appl. No. 13/961,444, Sep. 2, 2015, pp. 1-3, Alexandria, VA, USA.

United States Patent and Trademark Office, Notice of Allowance for U.S. Appl. No. 13/961,444, Dec. 30, 2015, pp. 1-12, Alexandria, VA, USA.

United States Patent and Trademark Office, Office Action for U.S. Appl. No. 15/059,610, May 5, 2016, pp. 1-16, Alexandria, VA, USA.

Jared M. Bibbee, Examiner, United States Patent and Trademark Office, Notice of Allowance for U.S. Appl. No. 15/059,610, Oct. 24, 2016, pp. 1-12, Alexandria, VA, USA.

* cited by examiner

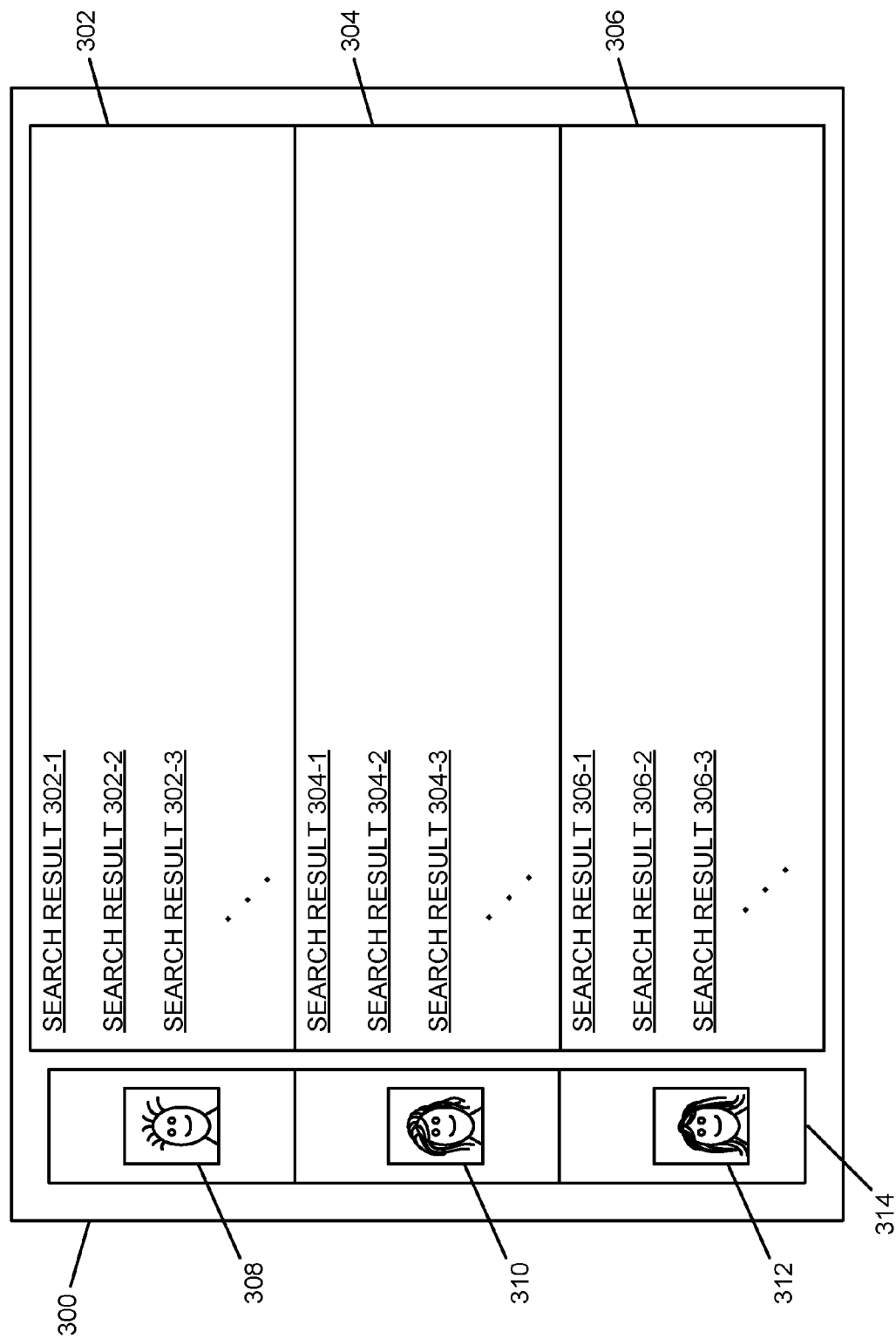

REAL-TIME SHARED WEB BROWSING AMONG SOCIAL NETWORK CONTACTS

BACKGROUND

The present invention relates to web browsing activities. More particularly, the present invention relates to real-time shared browsing among social network contacts.

Online social networks (OSNs) allow people to create accounts and to designate other persons with OSN accounts as social network contacts (e.g., friends). OSNs allow social network contacts to communicate with one another by posting messages and photographs within a forum of the OSN. The posted messages and photos may be accessed and viewed by other social network contacts within the respective OSN.

SUMMARY

A method includes determining, via a processor, that at least two social network contacts involved in a social messaging interaction each initiate a separate web search associated with the social messaging interaction; capturing, in association with each initiated separate web search, a separate set of web search results returned to each of the at least two social network contacts; and providing, to each of the at least two social network contacts, a combined live search results view comprising each captured separate set of web search results, where the combined live search results view provides navigation to web content returned to other social network contacts.

A system includes an output module; and a processor programmed to: determine that at least two social network contacts involved in a social messaging interaction each initiate a separate web search associated with the social messaging interaction; capture, in association with each initiated separate web search, a separate set of web search results returned to each of the at least two social network contacts; and provide, via the output module, to each of the at least two social network contacts, a combined live search results view comprising each captured separate set of web search results, where the combined live search results view provides navigation to web content returned to other social network contacts.

A computer program product includes a computer readable storage medium having computer readable program code embodied therewith, where the computer readable program code when executed on a computer causes the computer to: determine that at least two social network contacts involved in a social messaging interaction each initiate a separate web search associated with the social messaging interaction; capture, in association with each initiated separate web search, a separate set of web search results returned to each of the at least two social network contacts; and provide, to each of the at least two social network contacts, a combined live search results view comprising each captured separate set of web search results, where the combined live search results view provides navigation to web content returned to other social network contacts.

BRIEF DESCRIPTION OF THE DRAWINGS

FIG. 3A is a depiction of an example of an implementation of an initial state of a live search results view graphical user interface (GUI) for real-time shared web browsing among social network contacts according to an embodiment of the present subject matter;

DETAILED DESCRIPTION

Figure 1:
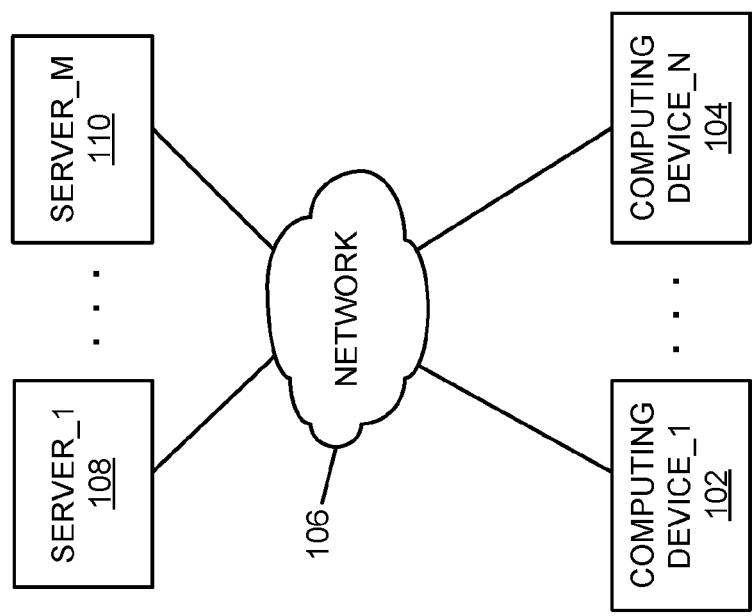
FIG. 1 is a block diagram of an example of an implementation of a system for real-time shared web browsing among social network contacts according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides real-time shared web browsing among social network contacts. The present technology operates to detect a social messaging interaction between social network contacts and to determine that multiple social network contacts involved in the social messaging interaction each initiate separate web search activities. Web search results returned to each individual social network contact are captured and collectively provided to each of the respective social network contacts within a combined "live" search results view. The combined live search results view may be updated as the respective social network contacts navigate through search results or perform additional searches, and other social network contacts may select navigated search results of other social network contacts in real time to arrive at the same web page that the originating social network contact is currently viewing. As such, browsing activities may be shared among social network contacts in real time, and other social network users may benefit from the searches performed by other social network contacts. Information exchange among social network contacts may be improved by use of the present technology.

The combined "live" search results view may be configured within a separate content partition for each social network contact. The respective browsing and search activities of each social network contact may be updated within the respective content partition. To identify and distinguish user associations with the respective content partitions, an online-posted photograph of each of the respective social network contacts may be rendered within the respective content partitions to further enhance social information exchange. Additionally or alternatively, a user moniker (e.g., a user identifier (ID), one or more tags, an avatar, a nickname, or other user-identifying attribute) may be used to identify and distinguish social network contacts that are associated with the respective content partitions. As such, social network contacts may easily recognize which of their respective social network contacts with which they are navigating in real time.

Additionally, when a hypertext link is selected by any of the social network contacts, a browsing summary of information content associated with a web page accessed by the selected hypertext link may be generated to transform the accessed data (web page content) into a form more readily and compactly viewed by other social network contacts. The browsing summary may include a summarized hypertext link that represents the captured portion of the information content associated with the web page accessed by the selected hypertext link. The summarized hypertext link may be formulated with a text representation that is different from the text representation within the original search results to further describe in summary form the accessed content so that other users may rapidly determine whether they have interest in navigating to the respective search result with their colleague/contact. The content summary may further include a text content summary that describes the captured portion of the information content associated with the web page accessed by the selected hypertext link.

The combined live search results view may be updated with the generated browsing summary. Any of the other social network contacts may view the summary to determine whether they would like to navigate to the same web page with their colleague/contact, and may select the provided summarized hypertext link to navigate directly to the web page to which the original social network contact has navigated and is currently viewing. As such, the present technology further improves shared navigation efficiency by summarizing the content of websites accessed by other social network contacts in real time without requiring other social network contacts to access the respective websites to see if the websites are of interest.

It should be noted that invocation of the present technology may occur in association with users logging into any linked services. For example, a user may log into an online social network (OSN) and may be provided with access to other linked services (e.g., an online email service, etc.) through one or more linked service providers. Alternatively, the user may log into an online email account provided by an online email account provider and be provided with access to other linked services (e.g., one or more OSNs) through one or more linked service providers. Through these linked services, the user may have access to friends (e.g., social network contacts) who are currently active within a social environment irrespective of their starting point within a social networking interaction, such as the provided OSN, the provided email account system, or other form of hosted interactive online environment. The user may further perform a web-based search for information via an online search engine to search for content. The content may or may not be associated with an email interaction/message received by the user.

In response to the web-based search, the search results may be presented to the user in one of a number of multiple-contact search results formats. As a first example multiple-contact search results format, the user's search results may be presented to the user on a single search page that is enhanced to show not only the user's own search results, but additionally online search activities associated with one or more friends (social network contacts) within the user's social network. This example format is described herein as the "live" search results view. As another example multiple-contact search results format, the user's search results may be presented to the user on a multiple-tabbed search page that is enhanced to show not only the user's own search results, but additionally online search activities associated with one or more friends in the user's social network partitioned onto the different tabbed search pages. It should be noted that other multiple-contact search results formats for rendering of multiple sets of search results of multiple social network contacts within a social network are possible and all such possibilities are considered within the scope of the present technology.

Regarding configuration options for rendering of multiple-contact search results, a numeric limit or friend preference may be configured as indicated by the user to control a quantity of social network annotations and correlations of search results. The presentation of the search results may be annotated in a variety of manners.

As a first example annotation, the user's friends that have posted online photographs within the OSN may have those pictures rendered next to their respective partition of search results to highlight which specific friend is on the respective website. As another example annotation, a friend count/quantity indicator may be provided to the user that indicates a number of friends that have their search results rendered within the multiple-contact search results formats or that are on a particular website. As a third example annotation, a user may group their friends into specific "online navigation social circles" or "online navigation groups." Such groupings may be marked and the marking may appear next to a web site to indicate which groups in the user's social network are on a particular website. As a fourth example annotation, the user may see these annotations presented based on an active browsing metric.

Further, "temporal animations" that represent time-based characteristics associated with web search results of other social network contacts may be configured and utilized to inform the user of the age of particular search results of other social network contacts that are represented within multiple-contact search results. For example, a size-based temporal animation may be configured to adjust/change a size of a rendered photograph size of a contact or other user moniker from a configured maximum size to a configured minimum size based upon an elapsed time from a time the search results were viewed by the respective contact. Multiple predetermined and configured times may be provided for incremental and/or fluid size adjustment of a photograph or other user moniker over time. In such an implementation, where a particular contact is currently viewing search results provided within the multiple-contact search results, the respective contact's photograph may be rendered at the configured maximum size initially, which may be selected to be any suitable size appropriate for a given implementation (e.g., based upon screen size, number of multiple-contact search results to render relative to display size, etc.), and may be decreased in size to the configured minimum size over time to represent non-contemporaneous search results.

As another example temporal animation, a resolution-based temporal animation may be configured to adjust a resolution or clarity of a rendered photograph of a contact by fading the photograph over time to further inform the user of the age of particular search results of other social network contacts that are represented within multiple-contact search results. Multiple predetermined and configured times may be provided for incremental and/or fluid fading/resolution adjustment of a photograph over time. In such an implementation, where a particular contact is currently viewing search results provided within the multiple-contact search results, the respective contact's photograph may be rendered at the configured maximum resolution/clarity initially, which may be selected to be any suitable resolution appropriate for a given implementation (e.g., based upon screen resolution, size of the rendered photograph relative to display size, etc.), and may be decreased in resolution/clarity to the configured minimum resolution or clarity over time to represent non-contemporaneous search results.

It should be noted that temporal animations may be combined or independently applied as appropriate for a given implementation. As such, the example resolution-based temporal animation may be applied in addition to or independently of size-based temporal animations. It should be noted that other temporal animations may be configured to represent time-based aging of search results for multiple-contact search results, and any such animations are considered within the scope of the present technology.

As described above, preliminary search results may be provided in association with each user as a first stage of rendering within the live search results view. Once any user begins navigating within their respective search results, a summary of the content accessed by the respective user's selection of a hypertext link within the user's search results may be generated and provided to the other users (social network contacts) as a second stage of rendering. This transformation of the accessed data to create the content summary provides a compact representation of the content accessed by the other user. Social network contacts that view the summary may determine that they are interested in viewing the content that is accessed by the other social network contacts based upon the transformed data represented within the generated content summary.

Any user that is viewing the content summary may navigate to the same page that was accessed by the other social network user (as represented by the content summary) by selecting (e.g., clicking on) an annotated social network indicator (e.g., the photo of the other contact). The user may then be taken within their respective partition of the live search results view to the website previously navigated to by the user's social network contact and may be directed to the exact page or sub-page of the respective website that their friend is currently or has previously visited. As such, users may be provided with an overview of navigation activities of their friends and colleagues, and may selectively navigate with any of their friends based upon the user's interests in the content found by the web-based searches of their friends.

Additionally, once the user's partition of the live search results view has navigated to the respective website previously navigated by their friend, annotated breadcrumbs may be provided within the content of the accessed website to show further navigation activities by the social network contact that previously navigated the web site. The annotated breadcrumbs may include a time-stamp, highlighting, footstep trail (e.g., where a user has navigated), or other indicator of where their friend has clicked or is currently surfing within the website.

It should be noted that the other social network contact's respective panel/partition within the live search results view may also be updated with a new content summary to reflect this additional navigation. Alternatively, higher-level resolution of navigation may be maintained within the live search results view and the generated content summaries to maintain additional clarity of higher-level search activities. These options may be considered configurable and may be implemented with a granularity appropriate for a given implementation.

It should further be noted that the present technology may be used to automatically form temporary social navigation networks that dynamically represent navigation circles of social network contacts, within which the social network contacts co-browse content. For example, in a situation as described above where a primary user/contact navigates to a search result and a friend or multiple friends also navigate along with the primary user based upon the generated content summary, the respective social network contacts may be configured into an ad hoc social navigation sub-network (e.g., a temporary social navigation sub-network). In response to such a configuration as a social sub-network, the live search results view of the respective social network contacts may be modified to only show the search results and navigation activities of the respective users configured within the social sub-network. Such a modification may reduce screen space occupancy by search results of other users that are not part of the social sub-network.

As a configuration option, the live search results view of other users that are not a part of the social sub-network may have the browsing activities of the social sub-network removed from their view of other social network contacts' search results, or the social sub-network user partitions may continue to be provided to non-social sub-network users. In the latter case, an annotation may be provided in association with each user/contact that is a part of the social sub-network so that other users know which users are within and a part of the social sub-network.

Additionally, where a user that is not a current member of an ad hoc social navigation sub-network selects an annotation of one of the social sub-network users, the new user may navigate into the search results of the social sub-network and may be added dynamically to the social sub-network. Again, as a configuration option, the new user may have its rendering of the live search results reduced to include only search partitions of the users within the social sub-network or may continue to view navigation activities of other users that are not a part of the ad hoc social navigation sub-network.

Additionally, the previous social sub-network users may have their live search results view updated to include a partition for the new social sub-network user(s) (if their view was previously configured to modify the live search results view to remove other users). Alternatively, if the previous social sub-network users have their live search results view configured to still show other users, an annotation may be added to the search partition of the other/new users to note the other/new social sub-network user has been added to and is a part of the ad hoc social navigation sub-network.

As another configuration option for dynamic creation of social sub-networks, users may allow spontaneous/automated formation of dynamic ad hoc social navigation sub-networks based upon shared interests. Within such an implementation, uniform resource locator (URL) references may be utilized to identify users that are interested in the same or similar topics. In response to identification of users that have navigated to the same URL, the present technology may be configured by the users to allow social sub-network formation granularity based upon URL components. For example, where a movie information website has sub-pages associated with different movies (e.g., "http:/ . . . /funny_movie" and "http:/ . . . /scary_movie"), users that access individual movie sub-pages may, where configured by the respective users to allow dynamic information-based ad hoc social navigation sub-network creation, be configured into a dynamic ad hoc social navigation sub-network to share information and ideas (and further shared search result navigation) with one another.

As such, dynamic ad hoc social navigation sub-networking may be provided to users to allow efficient group navigation of search results. Such dynamic ad hoc social navigation sub-networking may improve efficiency of problem resolution within engineering environments (e.g., research) and may improve problem resolution within social environments (e.g., where to go for lunch). Many possibilities exist for improvement of social information sharing and information gathering based upon the present technology and all such possibilities are considered within the scope of the present technology.

A navigation sharing configuration option may be implemented to allow users to selectively control sharing of their respective active web browsing activity with other friends (social network contacts). The navigation sharing configuration option may be implemented to allow granular sharing of web search results by search topic, time of day, or any other factor appropriate for a given implementation. For example, where a user is performing a search for banking or other confidential web-based inquiries, the user may configure searches associated with such a topic to not be shared with other social network contacts. Additionally, if the user prefers to perform hobby searches in the evenings, such activities may not be of interest to other users and the user may configure such searches to not be shared (either by topic or time of day) with other social network contacts.

Further, social network contacts may configure what information of other users they are interested in having shared with them. Where a particular social network contact is interested in all sports and another second social network contact is only interested a single sport, the second social network contact may configure navigation sharing options in association with the first social network contact such that only search results of the single sport of interest to the second social network contact result in updates and information within the second user's live search results view. Time-based and other configuration options for receipt of search results of other social network contacts may also be implemented to allow users to configure what types of information searches of others are retrieved.

The navigation sharing options may be configured within an enhanced view or a modified user interface may be presented to the user that would allow the user to selectively apply the navigation sharing options. Alternatively, the user may right click on the respective partitions or annotations of the individual users and may be presented with a pop-up dialog or menu to selectively apply the navigation sharing options. The user may further select within their individual browser a navigation sharing option to invoke the live search results view (e.g., "share with friends"). Many other possibilities for invocation and configuration of the navigation sharing options may be implemented and all such possibilities are considered within the scope of the present subject matter.

As such, any granularity of sharing of web search results may be selectively configured by the user to allow the user autonomous and thorough control of sharing of their search results and retrieval of the search results of other users. Accordingly, user privacy of information may be maintained, while allowing enhanced social information sharing where appropriate for the respective user(s). Additionally, users may control what information searches of others are provided for review and navigation based upon common interests and other factors as appropriate for a given user or implementation.

As another configuration option, users may configure a social web-browsing activity log to be created to capture their search activities and their friends' activities. The configured social web-browsing activity log may be passed on to other friends to further share the combined information search results.

A user may further select a differential search results viewing option to see a differential view between their active browsing activity and their friend's browsing activity. As such, where one or more users diverge in their search results, users may benefit from the divergence and gain additional information that results from such a divergence within a nested browsing history without having to re-perform multiple stages of web searching to arrive at the divergence point of the two searches.

It should further be noted that the present technology may be implemented across multiple partnered websites or services. As such, the individual users are not required to perform their respective web searches using the same application or service.

As an additional consideration, while the present examples utilize search results and the sharing of search results, the present technology may be implemented in association with other information access or retrieval. For example, users may use the present technology to share content housed in forms, records, service catalogs, databases, or any other information store/format, as appropriate for a given implementation, where multiple parties have an interest in data that is machine searchable. Regarding sharable content housed in forms, examples may include resume-profiled or job-profiled information, where a temporal recruiter social network is formed to co-browse/navigate through potential candidates. Regarding sharable content housed in records, an example may include electronic medical records (EMRs), where a temporal medical social network is formed to co-browse/navigate through patient histories. Regarding sharable content housed in service catalogs, examples may include products and/or services where a producer-consumer network is formed between business managers that determine the services and end-users that request the product/service in order to co-browse through the service data (e.g., service level agreements (SLAs), service availability, cost, etc.). Regarding databases, examples may include cloud databases where a programmer developer network is formed to develop or maintain a shared application and/or product.

Regarding implementation options, the present technology may, for example, be implemented as a plugin associated with another application. Alternatively, the present technology may be integrated into a search engine itself using configuration meta-data, or may be implemented as a third party service. As such, many possibilities exist for implementation of the present technology and all such possibilities are considered to be within the scope of the present subject matter.

The present technology is applicable to many forms of social networking interactions (e.g., messaging interactions). For example, social networking interactions such as chat session messaging interactions, instant messaging interactions, email messaging interactions, social network messaging interactions, and other forms of electronic communications may all be configured for the formation and utilization of real-time shared web browsing among social network contacts.

It should be noted that conception of the present subject matter resulted from recognition of certain limitations associated with social networking interactions. For example, it was observed that while online social networks (OSNs) provide a mechanism for users (social network contacts) to log in and connect with other people and to share information between the members, there is not currently a mechanism to allow people to see what web pages their friends may concurrently be browsing with a web browser (outside of the social networking application). In view of this observation, the present technology allows OSN participants to be able to see search engine results that are enhanced to show their respective social network contact's web browsing activities. The present subject matter improves social networking interaction by providing real-time shared web browsing among social network contacts, as described above and in more detail below. As such, improved social networking and research interaction may be obtained through use of the present technology.

The real-time shared web browsing among social network contacts described herein may be performed in real time to allow prompt (e.g., active) sharing of browsing activities among social network contacts. For purposes of the present description, real time shall include any time frame of sufficiently short duration as to provide reasonable response time for information processing acceptable to a user of the subject matter described. Additionally, the term "real time" shall include what is commonly termed "near real time"— generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for real-time shared web browsing among social network contacts. A computing device_1 102 through a computing device_N 104 communicate via a network 106 with each other and with a server_1 108 through a server_M 110.

As will be described in more detail below in association with FIG. 2 through FIG. 9, the computing device_1 102 through the computing device_N 104 and the server_1 108 through the server_M 110 may each provide automated real-time shared web browsing among social network contacts. The real-time shared web browsing among social network contacts is based upon identifying and sharing individual search results obtained by users of the computing device_1 102 through the computing device_N 104 (e.g., in response to searches performed using one or more of the server_1 108 through the server_M 110), and correlation of the separate search results into a combined live search result view. The present technology may be implemented at a user computing device or server device level, or at a combination of the two forms of devices, as appropriate for a given implementation. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, an email or other messaging server, a social networking server, or other data server device.

Figure 2:
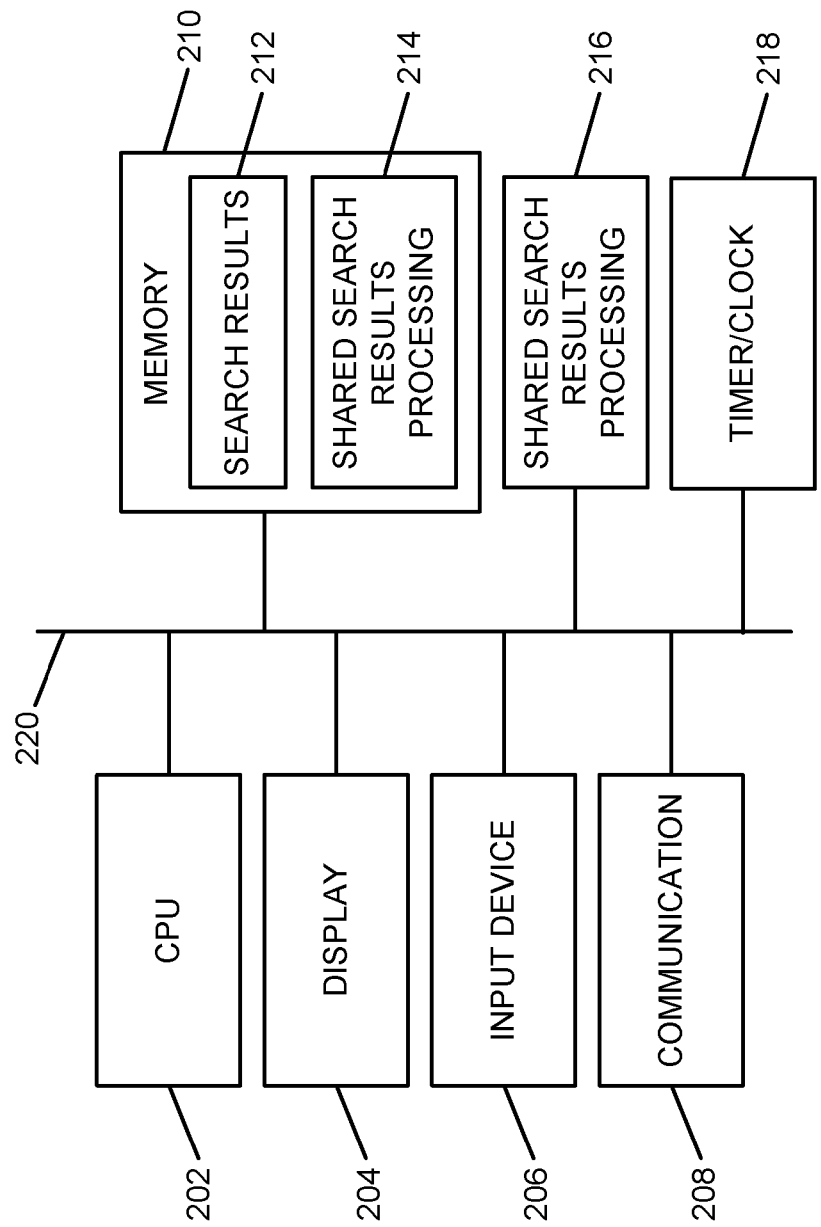
FIG. 2 is a block diagram of an example of an implementation of a core processing module capable of performing real-time shared web browsing among social network contacts according to an embodiment of the present subject matter.

FIG. 2 is a block diagram of an example of an implementation of a core processing module 200 capable of performing real-time shared web browsing among social network contacts. The core processing module 200 may be associated with either the computing device_1 102 through the computing device_N 104 or with the server_1 108 through the server_M 110, as appropriate for a given implementation. Further, the processing performed by the core processing module 200 may be partitioned and associated with a computing device in combination with a server device. As such, the core processing module 200 is described generally herein, though it is understood that many variations on implementation of the components within the core processing module 200 are possible and all such variations are within the scope of the present subject matter.

Further, the core processing module 200 may provide different and complementary processing of shared search results in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

For purposes of the present description, each of the display 204 and the communication module 208 may be considered an "output module." As such, for a server-based implementation, either or both of the display 204 and the communication module 208 may be used to provide/output renderable content. Similarly, for a client device-based implementation, either or both of the display 204 and the communication module 208 may be used to provide/output renderable content.

A memory 210 includes a search results storage area 212 that stores one or more sets of search results within the core processing module 200. The search results storage area 212 may store searches for multiple social network contacts in association with processing as described herein.

The memory 210 also includes a shared search results processing area 214. The shared search results processing area 214 provides storage space for correlation and processing of multiple sets of search results as described herein.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A shared search results processing module 216 is also illustrated. The shared search results processing module 216 provides compilation, correlation, and other processing of search results sets within the core processing module 200, as described above and in more detail below. The shared search results processing module 216 implements the automated real-time shared web browsing among social network contacts of the core processing module 200.

It should also be noted that the shared search results processing module 216 may form a portion of other circuitry described without departure from the scope of the present subject matter. Further, the shared search results processing module 216 may alternatively be implemented as an application stored within the memory 210. In such an implementation, the shared search results processing module 216 may include instructions executed by the CPU 202 for performing the functionality described herein. The CPU 202 may execute these instructions to provide the processing capabilities described above and in more detail below for the core processing module 200. The shared search results processing module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as for use in aging annotations associated with social network contacts, as described above and in more detail below. As such, the shared search results processing module 216 may utilize information derived from the timer/clock module 218 for information processing activities, such as the real-time shared web browsing among social network contacts.

The CPU 202, the display 204, the input device 206, the communication module 208, the memory 210, the shared search results processing module 216, and the timer/clock module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

FIG. 3A through FIG. 3D described below represent example graphical user interface (GUI) implementations that represent data transformations of search results and navigation activities of friends (social network contacts) for real-time shared web browsing among social network contacts. Many other variations on the example GUI representations are possible and all are considered within the scope of the present subject matter.

FIG. 3A is a depiction of an example of an implementation of an initial state of a live search results view GUI 300 for real-time shared web browsing among social network contacts. For purposes of the present example, it is assumed that a group of social network contacts has been communicating, such as through an instant messaging or email system (e.g., as implemented via one or more of the server_1 108 through the server_M 110) about a movie, and that the users each individually have begun performing a web search for information related to a particular movie of interest. It is further assumed for purposes of the present example, that each user has received search results and that the search results have been initially rendered within respective independent web browsers of computing devices utilized by the respective users.

Regarding the initial state of the live search results view GUI 300, in response to determining that the social network contacts have each been searching for results associated with the same/similar topic (e.g., the movie about which they are communicating via instant messaging), an ad hoc social navigation sub-network is represented to have been formed that includes the social network contacts. It is understood that different individuals may perform different searches, such as for movie show times, movie reviews, movie trailers, or other searches. The present technology may detect such variations for searches of similar content related to the same topic (e.g., the movie) and may form an ad hoc social navigation sub-network using factors as appropriate for a given implementation and configuration.

Additionally, the live search results view GUI 300 is illustrated to have been created and rendered for each of the social network contacts within the ad hoc social navigation sub-network to show the individual search results returned to each of the social network contacts to all social network contacts within the ad hoc social navigation sub-network. It is further noted that while one formatted representation of the live search results view GUI 300 is presented for purposes of example (e.g., partitions of a single browser window, as described below), many other variations on the live search results view GUI 300 are possible. For example, rather than using partitions within a single browser window, multiple tabbed browser windows within a single browser executable may be used, or any other form of partitioning may be used, as appropriate for a given implementation. As such, any and all such variations are considered to be within the scope of the present technology.

As can be seen from FIG. 3A, a live-browsing partition 302, a live-browsing partition 304, and a live-browsing partition 306 are shown to have been created for a social contact 308, a social contact 310, and a social contact 312, respectively. The live-browsing partition 302 includes search results of the social contact 308 (listed as "search result 302-1," "search result 302-2," and "search result 302-3," etc. as noted by the ellipsis dots). Similarly, the live-browsing partition 304 includes search results of the social contact 310 (listed as "search result 304-1," "search result 304-2," and "search result 304-3," etc.). The live-browsing partition 306 also includes search results of the social contact 312 (listed as "search result 306-1," "search result 306-2," and "search result 306-3," etc.).

It should further be noted that a photograph of each of the social network contacts 308 through 312 has been rendered within a respective partition of a live social browsing bar 314 within the live search results view GUI 300. The live social browsing bar 314 and the photographs of the respective social network contacts may assist users with recognition of which social network contacts are within the ad hoc social navigation sub-network and associated with the respective live-browsing partitions 302 through 306. For purposes of the present description, the photographs are considered "annotations" that, as described above and in more detail below, may selected (e.g., via a mouse/cursor) by users to invoke advanced-stage processing within the live search results view GUI 300. These annotations may be animated as described above (e.g., size changes, resolution changes, etc.) to represent aging of individual sets of search results or other information as appropriate for a given implementation.

The initial state of the live search results view GUI 300 may be provided to each user/contact. It should be noted that variations in the rendering of the live search results view GUI 300 may be provided to each user over time based upon the respective additional searching or browsing activities (e.g., selection of one or more search results) of the user, and selection of hypertext links associated with items of content rendered in association with sub-pages accessed by the search results. Additionally, variations in the rendering of the live search results view GUI 300 may be provided to each user over time based upon the respective additional searching or browsing activities of other users in the ad hoc social navigation sub-network.

As an additional note, other social network contacts of users within the ad hoc social navigation sub-network may be provided with access to the live search results view GUI 300 and may join the ad hoc social navigation sub-network, as configured by users or administrators of the present technology. As such, other social network contacts may benefit from research performed by their colleagues and social network contacts, and the other social network contacts may further the research to the benefit of original members of the ad hoc social navigation sub-network.

For purposes of the remainder of the example implementation of the live search results view GUI 300 represented within FIGS. 3B through 3D below, it is assumed that variations of the rendering of the live search results view GUI 300 are illustrated from the perspective of the live search results view GUI 300 as rendered to the social contact 312 (e.g., the bottom social contact associated with the live-browsing partition 306 within the live social browsing bar 314). It is understood that alternative variations of the live search results view GUI 300 may be provided to each other social contact based upon the activities of the respective social contact and based upon activities of other social network contacts within the ad hoc social navigation sub-network. The present example continues within FIG. 3B.

Figure 3B:
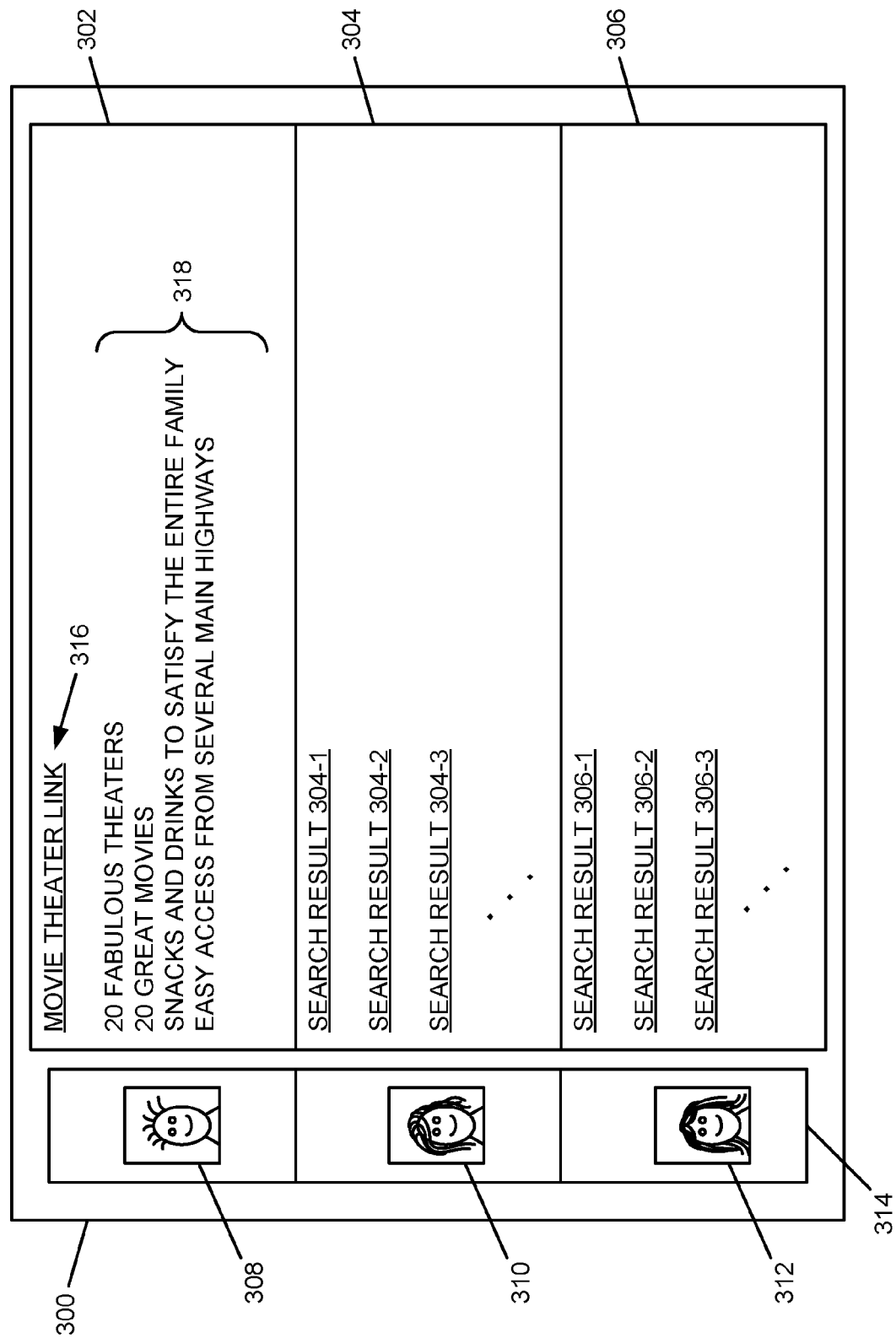
FIG. 3B is a depiction of an example of an implementation of a second state of the live search results view GUI of FIG. 3A for real-time shared web browsing among social network contacts according to an embodiment of the present subject matter.

FIG. 3B is a depiction of an example of an implementation of a second state of the live search results view GUI 300 of FIG. 3A for real-time shared web browsing among social network contacts. As can be seen from FIG. 3B, content within the live-browsing partition 302 has been changed from the initial state illustrated in FIG. 3A. Again, it is understood that this illustration of the live search results view GUI 300 is from the perspective of the user associated with the social contact 312 (e.g., the bottom social contact associated with the live-browsing partition 306 within the live social browsing bar 314).

With this perspective in mind, the illustration of the example live search results view GUI 300 within FIG. 3B represents additional browsing activities by the social contact 308 associated with the live-browsing partition 302. For purposes of the present example, it is assumed that the social contact 308 selected one of the search results (e.g., a hypertext link) represented within FIG. 3A within the live-browsing partition 302, and navigated to the respective web site/page accessed by the hypertext link, and is currently viewing content on that web site (potentially including additional browsing and hypertext link selections).

The present technology operates to transform the data accessed by the social contact 308 on the web site into a content summary of the friend's live browsing activities. The content summary of the friend's live browsing activities allows other social network contacts, such as the social contact 310 and the social contact 312, to determine whether they are interested in also navigating to the same site to surf the web contemporaneously with their friend/colleague to navigate to websites and view the same content.

The present technology may operate by accessing the respective website (as accessed by the social contact 308), capturing at least a portion of information content associated with a web page accessed by the selected hypertext link, and generating the content summary of the captured portion of the information content associated with the web page accessed by the selected hypertext link. The combined live search results view represented by the live search results view GUI 300 is updated for each of the respective other social network contacts within the ad hoc social navigation sub-network with the generated content summary of the captured portion(s) of the information content associated with the web page accessed by the selected hypertext link.

Within the present example, the generated and rendered content summary of the friend's live browsing activities includes a summarized hypertext link that is shown to have been created based upon the captured web site content. As can be seen from FIG. 3B, the summarized hypertext link describes the content of the accessed site, and describes the content to be found on that web site as, in this example, "Movie Theater Link" 316.

The generated and rendered content summary of the friend's live browsing activities also includes a text content summary 318 that further describes content that may be accessed on the respective web site if the social contact 312 (or the social contact 310) is interested in navigating to the respective web site. It is understood that the example second state of processing of the live search results view GUI 300 may be rendered in identical form of the social contact 310 because no other social browsing activity has occurred at this stage of the present example.

It should further be noted that where a social contact performs additional browsing and hypertext link selections after initially navigating to a web site (and after initial generation of a content summary), additional content summaries may be generated for each such navigation. Alternatively, as described above and in more detail below, to reduce confusion among social network contacts, a single content summary is utilized within the present example. In such an implementation, "breadcrumbs" may be used instead of (or in addition to) generating new content summaries to allow more stability in association with higher-level content summaries, while allowing users that actually navigate along with their friends to identify additional navigation activities of other friends. This variation for the use of breadcrumbs is illustrated and described in association with FIG. 3D below, in favor of additional description of intermediate processing of the present example beginning with FIG. 3C.

Figure 3C:
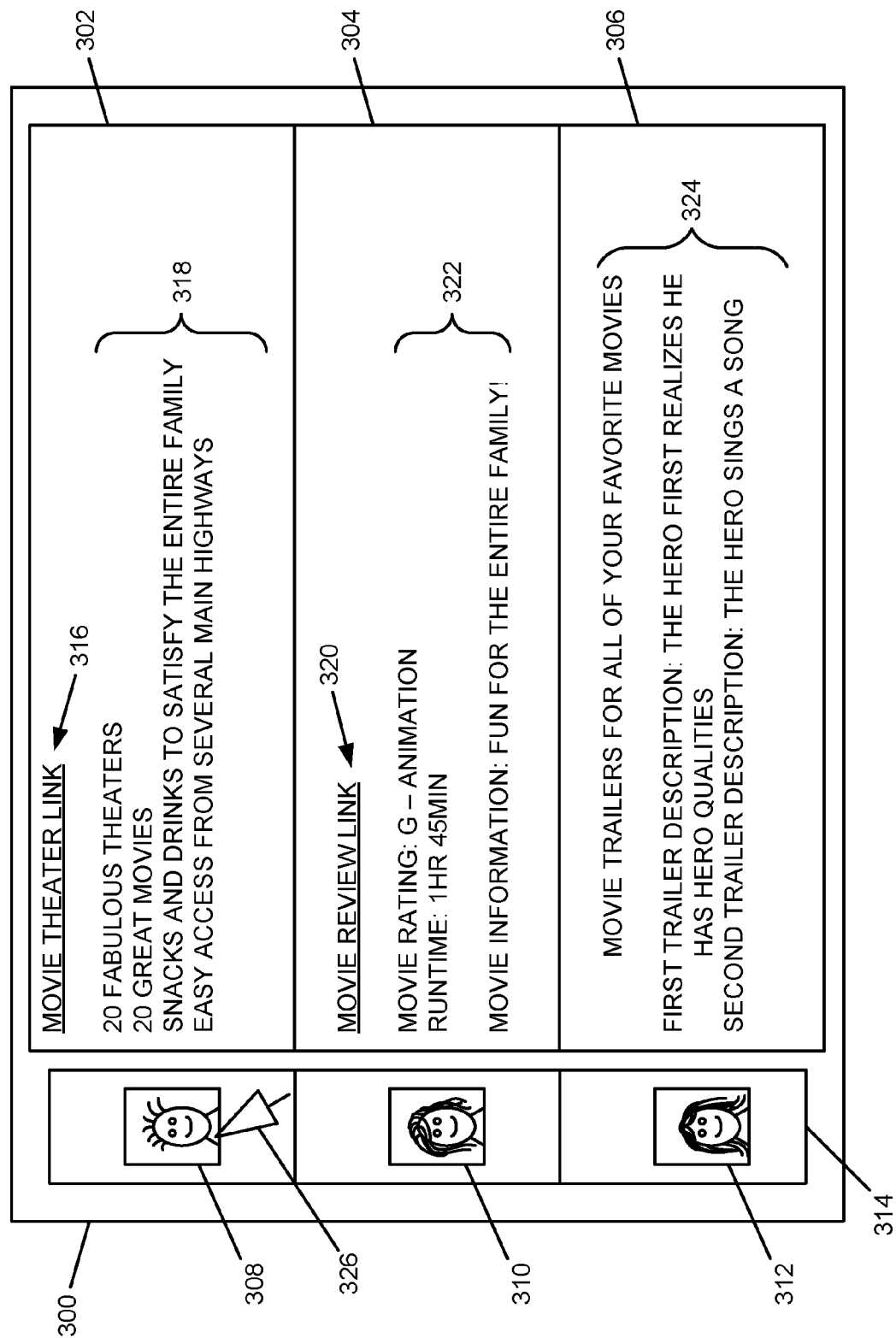
FIG. 3C is a depiction of an example of an implementation of a third state of the live search results view GUI of FIG. 3A relative to FIG. 3B for real-time shared browsing among social network contacts according to an embodiment of the present subject matter.

FIG. 3C is a depiction of an example of an implementation of a third state of the live search results view GUI 300 of FIG. 3A relative to FIG. 3B for real-time shared browsing among social network contacts. As can be seen from FIG. 3C, content within the live-browsing partition 304 and content within the live-browsing partition 306 have both been changed from the second state illustrated in FIG. 3B. Again, it is understood that this illustration of the live search results view GUI 300 is from the perspective of the user associated with the social contact 312 (e.g., the bottom social contact associated with the live-browsing partition 306 within the live social browsing bar 314).

With this perspective in mind, the illustration of the example live search results view GUI 300 within FIG. 3C represents additional browsing activities by each of the social contact 310 and the social contact 312 associated with the live-browsing partitions 304 and 306, respectively. For purposes of the present example, it is assumed that each of the social contact 310 and the social contact 312 have also selected one of the search results (e.g., a hypertext link) represented within FIG. 3B within the live-browsing partition 304 and within FIG. 3C within the live-browsing partition 306, respectively. In response to each selection by the respective social network contacts, the respective social contact is navigated to the respective web site/page accessed by the respective hypertext link, and is currently viewing content on that web site within their respective partitions and within their respective renderings of the live search results view GUI 300.

With respect to the navigation activities of the social contact 310, as described above, the present technology operates to transform the data accessed by the social contact 310 on the web site into a content summary of the friend's live browsing activities. The content summary of the friend's live browsing activities allows other social network contacts, such as the social contact 308 and the social contact 312 within this state of the example, to determine whether they are interested in also navigating to the same site to surf the web contemporaneously with their friend/colleague to navigate to websites and view the same content.

Again, the present technology may operate by accessing the respective website (as accessed by the social contact 310), capturing at least a portion of information content associated with a web page accessed by the selected hypertext link, and generating the content summary of captured portion of the information content associated with the web page accessed by the selected hypertext link. Within the present example, the generated and rendered content summary of the friend's live browsing activities includes a summarized hypertext link that is shown to have been created based upon the captured web site content. As can be seen from FIG. 3C, the summarized hypertext link describes the content of the accessed site, and describes the content to be found on that web site as, in this example, "Movie Review Link" 320. The generated and rendered content summary of the friend's live browsing activities also includes a text content summary 322 that further describes content that may be accessed on the respective web site if the social contact 312 (or the social contact 308) is interested in navigating to the respective web site.

With respect to the navigation activities of the social contact 312, because the perspective of the live search results view GUI 300 is from the perspective of the social contact 312, actual web content 324 that is accessed when the social contact 312 selects one of the search results within the live-browsing partition 306 is rendered for this particular social contact. It is understood that a content summary may also be generated and rendered to the other social network contacts 308 and 310 within their respective views of the live search results view GUI 300 that describes the browsing activities of the social contact 312.

It should additionally be noted, that for purposes of the present example, it is assumed that the social contact 312 is interested in navigating along with the social contact 308. The present technology further provides contemporaneous live social browsing by allowing users to select navigations traversed by their friends/colleagues. Within the present example, the social contact 312 is assumed to have directed an input device (e.g., a mouse) to place a cursor 326 over the annotation/photograph of the social contact 308. The social contact 312 is further assumed to initiate a select operation with the input device (e.g., left click) to invoke contemporaneous live social browsing with the social contact 308. A next state of the present example is illustrated and described below in association with FIG. 3D.

It should be noted that, while the present example utilizes selection of an annotation associated with a social contact to invoke contemporaneous live social browsing, other forms of contemporaneous live social browsing invocation are possible. For example, the social contact 312 may alternatively select the Movie Theater Link 316 or any portion of the text content summary 318 (e.g., any section of the live-browsing partition 302 or the partition of the live social browsing bar 314 associated with the social contact 308) to invoke contemporaneous live social browsing. However, it should be noted that it may be intuitive from a human-factors design perspective to configure an implementation within the live search results view GUI 300 to respond to selections of social contact annotations as at least one option to invoke contemporaneous live social browsing.

Figure 3D:
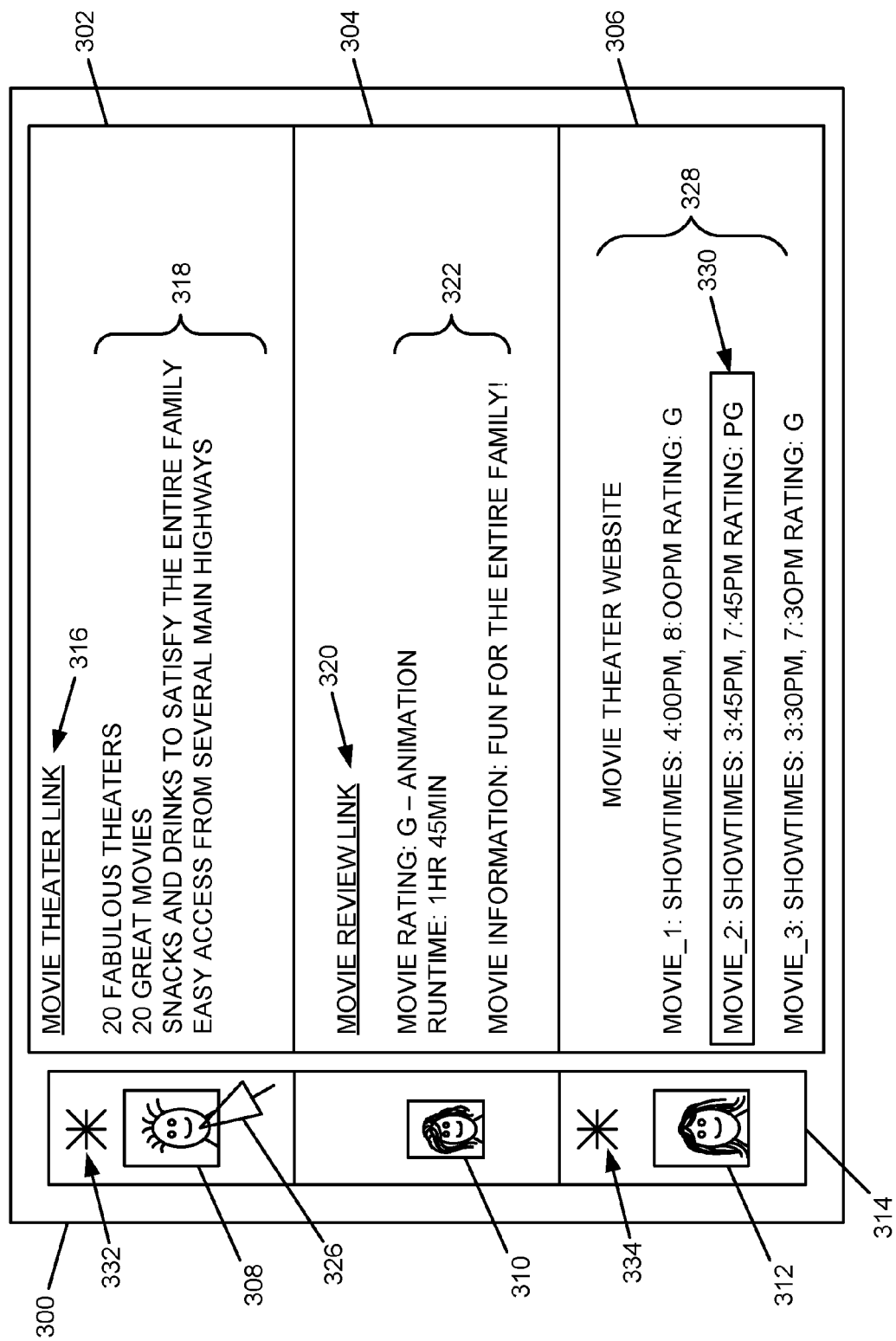
FIG. 3D is a depiction of an example of an implementation of a fourth state of the live search results view GUI of FIG. 3A relative to FIG. 3C for real-time shared web browsing among social network contacts according to an embodiment of the present subject matter.

It is assumed for purposes of the present state of the present example that the social contact 312 selected the annotation of the social contact 308 using the input device, and that a subsequent state of the live search results view GUI 300 is depicted within FIG. 3D. The present example continues within FIG. 3D.

FIG. 3D is a depiction of an example of an implementation of a fourth state of the live search results view GUI 300 of FIG. 3A relative to FIG. 3C for real-time shared web browsing among social network contacts. As can be seen from FIG. 3D, in response to selection of the annotation of the social contact 308 by the social contact 312, content within the live-browsing partition 306 has been changed from the state illustrated in FIG. 3C. Again, it is understood that this illustration of the live search results view GUI 300 is from the perspective of the user associated with the social contact 312 (e.g., the bottom social contact associated with the live-browsing partition 306 within the live social browsing bar 314).

With this perspective in mind, the illustration of the example live search results view GUI 300 within FIG. 3D represents a contemporaneous navigation to the web site previously accessed by the social contact 308. As such, web site content 328 of the actual web site previously accessed by the social contact 308 is illustrated to have been updated and rendered to the social contact 312 within that social contact's respective view of the live search results view GUI 300. As can be seen from FIG. 3D, the accessed web site is represented as the movie theater website that has been accessed by the social contact 308, and includes showtimes of various movies that are playing at the theater. This content is the content represented by the content summary generated in association with the social contact 308, as described above, that has been presented to the social contact 312 within the live-browsing partition 302.

For purposes of the present example, it is also assumed that the social contact 308 has selected one of the hypertext links presented to that social contact on the accessed web site. The other social contact's navigation activity is illustrated to the social contact 312 using rendering of a "breadcrumb" 330. The breadcrumb 330 is illustrated within the present example as a box due to limitations of drawing preparation. However, it is understood that the breadcrumb 330 may be presented in any format suitable for a given implementation, such as highlighting with text features (e.g., font, bolding, etc.), highlighting with color or characters (e.g., asterisks, etc.), highlighting with reverse video, or other form of indicator that identifies navigation by another social contact on a web page accessed by a friend/colleague. Using the breadcrumb 330, the social contact 312 may also navigate to the content accessed using the hypertext link highlighted by the breadcrumb 330.

It should further be noted that the respective partitions of the live social browsing bar 314 associated with the social contact 308 and the social contact 312 have been updated to include a contemporaneous browsing indicator 332 and 334, respectively. While illustrated as a form of asterisk, the contemporaneous browsing indicator 332 and 334 may be formed in any manner suitable for a given implementation, including a color change or other indication of shared browsing activities.

Each of the respective views of the live search results view GUI 300 as presented to the social contact 308 and the social contact 310 may also be updated with the contemporaneous browsing indicator 332 and 334 so that all social network contacts within the ad hoc social navigation sub-network may be informed of shared browsing activities. Use of the contemporaneous browsing indicator 332 and 334 may provide enhanced usability as more users are informed of shared browsing activities, and those users may also navigate to sites that are of particular interest to friends/colleagues.

As also described above, annotations (e.g., photographs) may be animated, such as by use of changes in size and/or resolution of rendered annotations, to show aging of search results and/or generated content summaries. For purposes of the present example, it is assumed that the social contact 310 has not participated in the ad hoc social navigation sub-network for an amount of time configured to cause animation/aging of the annotation associated with the social contact 310. As such, and can be seen within FIG. 3D, the photograph/annotation rendered in association with the social contact 310 has been animated within the present example by reducing the rendered size/dimensions of the annotated photograph relative to other rendered annotations. This form of annotation represents to other social network contacts within the ad hoc social navigation sub-network that the social contact 310 has potentially left the ad hoc social navigation sub-network. However, for the benefit of other users within the ad hoc social navigation sub-network, the search results of the social contact 310 may be provided for a configurable period of time so that other users within the ad hoc social navigation sub-network may benefit from search results found by the social contact 310. Many other variations on animations of social contact annotations are possible to represent aging of or other information about search results, and all such variations are considered within the scope of the present technology.

It should also be noted that each of the respective views of the live search results view GUI 300 as presented to the social contact 308 and the social contact 310 may also be updated with a content summary of the web site accessed by the social contact 312 (as also accessed by the social contact 308). Within these respective views, the content summary may be as illustrated in association with the live-browsing partition 302 to further enhance recognition by other users of the shared browsing activities of the social contact 308 and the social contact 312.

As such, the example live search results view GUI 300 may operate to transform data accessed by social network contacts into representational forms that are selectable by other social network contacts to invoke contemporaneous live social browsing. Many other variations on the present example are possible and all such variations are considered to be within the scope of the present technology.

As also described above, a social web-browsing activity log of the web search and contemporaneous live social browsing activities of the social network contacts may be created and shared with other social contact to further improve search results sharing among friends and colleagues. Further, as also described above, the contemporaneous live social browsing and sharing of search results with other social network contacts may be regulated by individual users or corporate entities using navigation sharing configuration options.

It should also be noted that the social network contacts within the ad hoc social navigation sub-network may also continue communicating using other communication channels during the formation of the ad hoc social navigation sub-network, either by voice communications, text messaging, chat or instant messaging, email messaging, or otherwise. The social network contacts may share browsing activities with one another using the live search results view GUI 300 to expedite and improve research efficiency. As such, improved social networking and research interaction may be obtained through use of the present technology.

Figure 4:
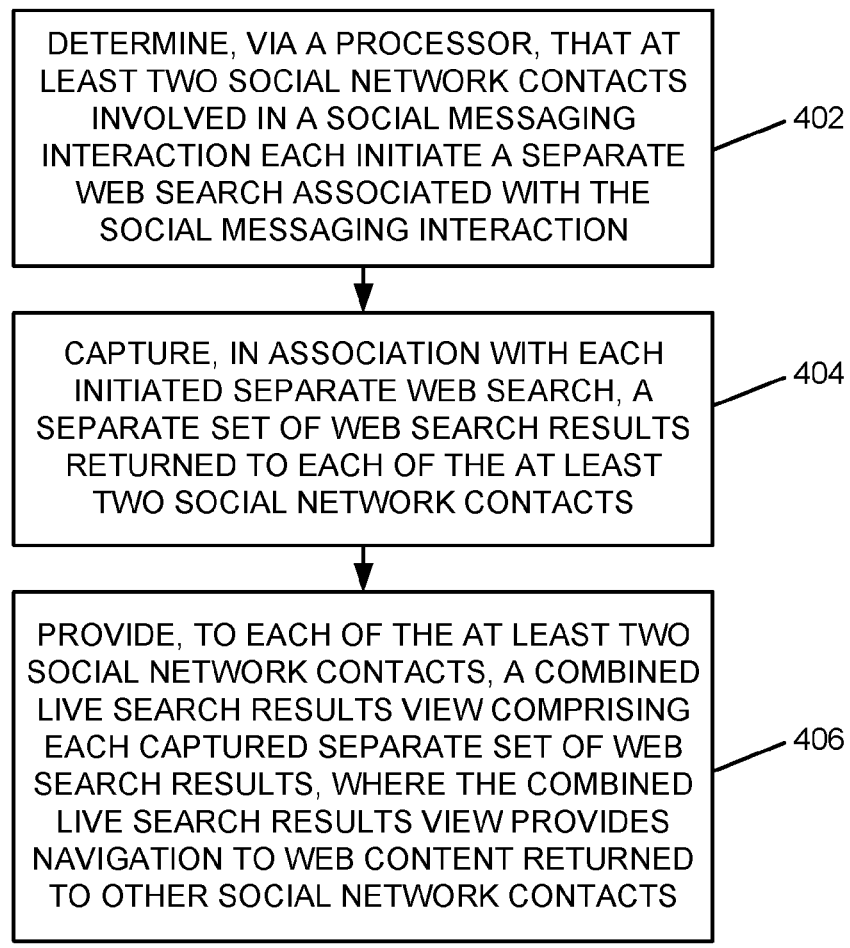
FIG. 4 is a flow chart of an example of an implementation of a process for real-time shared web browsing among social network contacts according to an embodiment of the present subject matter.
Figure 5A:
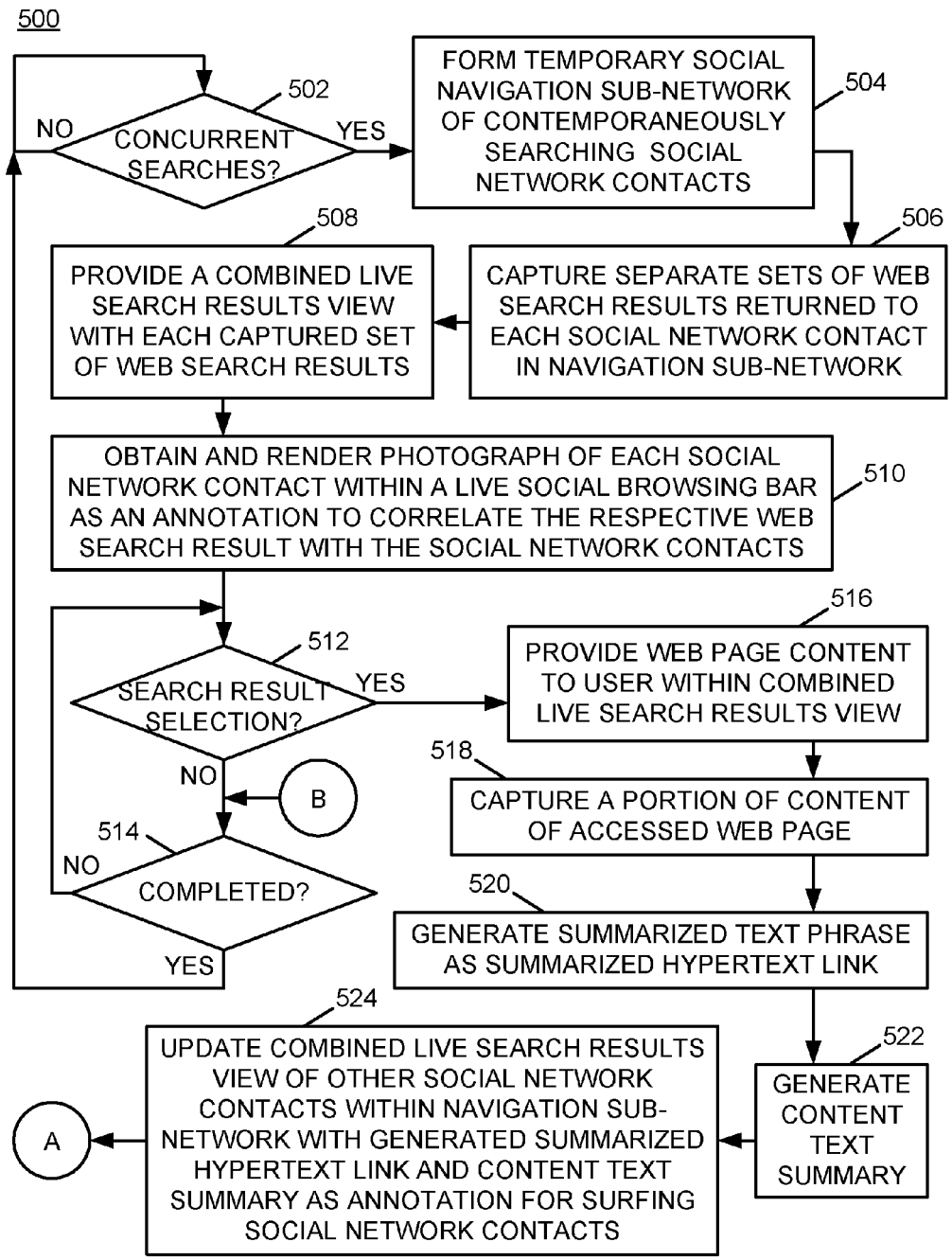
FIG. 5A is a flow chart of an example of an implementation of initial processing within a process for real-time shared web browsing among social network contacts that correlates initial web searches by social network contacts and that processes subsequent browsing activities by the social network contacts within a temporary social navigation sub-network according to an embodiment of the present subject matter.
Figure 5B:
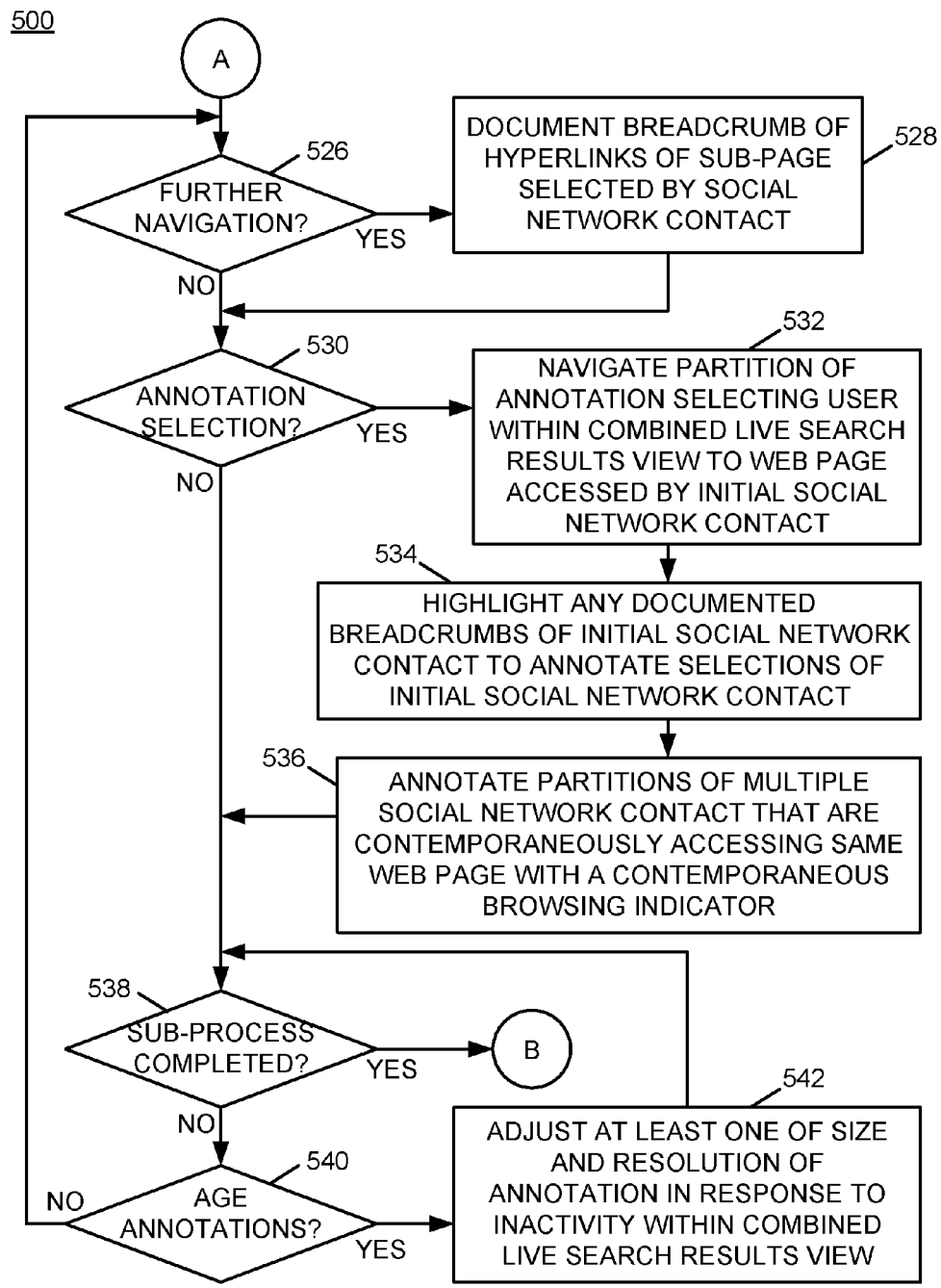
FIG. 5B is a flow chart of an example of an implementation of additional processing within a process for real-time shared web browsing among social network contacts that correlates initial web searches by social network contacts and that processes subsequent browsing activities by the social network contacts within a temporary social navigation sub-network according to an embodiment of the present subject matter.

FIG. 4 through FIG. 5B described below represent example processes that may be executed by devices, such as the core processing module 200, to perform the automated real-time shared web browsing among social network contacts associated with the present subject matter. Many other variations on the example processes are possible and all are considered within the scope of the present subject matter. The example processes may be performed by modules, such as the shared search results processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for real-time shared web browsing among social network contacts. At block 402, the process 400 determines, via a processor, that at least two social network contacts involved in a social messaging interaction each initiate a separate web search associated with the social messaging interaction. At block 404, the process 400 captures, in association with each initiated separate web search, a separate set of web search results returned to each of the at least two social network contacts. At block 406, the process 400 provides, to each of the at least two social network contacts, a combined live search results view comprising each captured separate set of web search results, where the combined live search results view provides navigation to web content returned to other social network contacts.

FIGS. 5A-5B illustrate a flow chart of an example of an implementation of process 500 for real-time shared web browsing among social network contacts that correlates initial web searches by social network contacts and that processes subsequent browsing activities by the social network contacts within a temporary social navigation sub-network. FIG. 5A illustrates initial processing within the process 500. At decision point 502, the process 500 makes a determination as to whether concurrent web searches by multiple social network contacts associated with a particular topic have been detected. As described above, concurrent web searches by multiple social network contacts associated with a particular topic may be detected in association with research activities (e.g., business, entertainment, etc.) performed by multiple social network contacts that are each trying to learn more about the respective topic. The concurrent web searches may be detected in association with a social messaging interaction between social network contacts. The social messaging interaction may include a chat session messaging interaction, an instant messaging interaction, an email messaging interaction, and/or a social network messaging interaction. It should be noted that the process 500 may be implemented as a multi-threaded process so that multiple stages of processing may be performed in association with different social network contacts concurrently.

In response to determining at decision point 502 that concurrent web searches by multiple social network contacts associated with a particular topic have been detected, the process 500 forms/creates a temporary ("ad hoc") social navigation sub-network of contemporaneously searching social network contacts at block 504. The temporary social navigation sub-network includes the social network contacts that have been detected to have performed the contemporaneous web searches. At block 506, the process 500 captures, in association with each initiated separate web search, a separate set of web search results returned to each of the social network contacts within the ad hoc social navigation sub-network.

At block 508, the process 500 provides, to each of the social network contacts, a combined live search results view that includes each captured separate set of web search results. The combined live search results view may be provided to each social network contact by communication of content to computing devices used by the respective social network contacts. The combined live search results view may be represented as described above within FIG. 3A through FIG. 3D or otherwise as appropriate for a given implementation. For example, instead of partitions, multiple tabbed browser views or other formatting may be utilized, again as appropriate for a given implementation.

As described above and in more detail below, the combined live search results view provides navigation for social network contacts to specific web pages contemporaneously accessed by other social network contacts in response to selection of a search result (or content summary as described in more detail below) selected by the respective other social network contact. Providing the combined live search results view to each social network contact may include providing, for each social network contact, a separate browser content partition within a unified content panel of the combined live search results view and providing the captured web search results returned to each social network contact within the respective separate browser content partitions provided for the respective social network contacts.

At block 510, the process 500 obtains and renders a photograph of each social network contact as an annotation to correlate the respective web search results within a combined live social browsing bar associated with the combined live search results view. As such, other social network contacts within the temporary (at hoc) navigation social sub-network may readily determine which set of search results are associated with the respective other social network contacts.

At decision point 512, the process 500 makes a determination as to whether a selection by one of the social network contacts of one of their own search results has been detected within the live search results view. In response to determining that a selection by one of the social network contacts of one of their own search results has not been detected within the live search results view, the process 500 begins iteration at decision point 514 to determine whether processing within the combined live search results view and the temporary navigation social sub-network has been completed. Completion of processing within the combined live search results view and the temporary navigation social sub-network may be determined, for example, where all social network contacts have closed their respective views, where a configured idle time associated with all social network contacts has expired, or where another indication of completion of the temporary navigation social sub-network has been detected as appropriate for a given implementation. In response to determining at decision point 514 that processing within the combined live search results view and the temporary navigation social sub-network has been completed, the process 500 returns to decision point 502 and iterates as described above. Alternatively, in response to determining at decision point 514 that processing within the combined live search results view and the temporary navigation social sub-network has not been completed, the process 500 returns to decision point 512 and iterates as described above.

In response to determining at decision point 512 that a selection by one of the social network contacts of one of their own search results has been detected within the live search results view, the process 500 provides web page content of the accessed web page to the respective user within their combined live search results view at block 516. At block 518, the process 500 captures a portion of information content associated with a web page accessed by the selected hypertext link. At block 520, the process 500 begins generation of a content summary of the captured portion of the information content associated with the web page accessed by the selected hypertext link by generating a summarized text phrase as a summarized hypertext link that represents the captured portion of the information content associated with the web page accessed by the selected hypertext link. This processing may be performed by analyzing text content associated with the accessed web page or other processing as appropriate for a given implementation. At block 522, the process 500 generates a content text summary that describes the captured portion of the information content associated with the web page accessed by the selected hypertext link.

At block 524, the process 500 updates the combined live search results view provided to other social network contacts of the temporary navigation sub-network with the generated content summary associated with the web page accessed by the selected hypertext link provided within a respective separate partition of the provided combined live search results view associated with the social contact that first selected the hypertext link. As such, temporary navigation social sub-network contacts may be presented with a summarized view of additional browsing activities of other social network contacts within the temporary navigation social sub-network. Any user that is interested in the particular browsing activities of other social network contacts may navigate along with the other social network contact, as described above and in more detail below.

It should further be noted that the generated content summary may also be considered an annotation associated with the respective social network contacts. As such, the generated content summary or the rendered annotated photograph may be selectable to invoke a contemporaneous navigation with other social network contacts.

The process 500 transitions to the processing shown and described in association with FIG. 5B.

FIG. 5B illustrates additional processing associated with the process 500 for real-time shared web browsing among social network contacts that correlates initial web searches by social network contacts and that processes subsequent browsing activities by the social network contacts within a temporary social navigation sub-network. At decision point 526, the process 500 begins an iterative sub-processing phase to further correlate contemporaneous browsing activities by social network contacts within the temporary navigation social sub-network and makes a determination as to whether further navigation has been detected in association with the user (any user) for which the content summary has been created (e.g., the social contact that originally selected the hypertext link search result and for which the content summary has been created). As described above, breadcrumbs may be documented in association with additional navigation activities by social network contacts to assist social network contacts that are interested in following research/search activities of other users. It should further be noted that, as described above, the process 500 may be multi-threaded and may asynchronously perform the described processing for each such social network contact.

In response to determining at decision point 526 that further navigation has been detected in association with the user (any user) for which the content summary has been created, the process 500 documents a breadcrumb of each hypertext link of any sub-page selected by the social network contact as the social network contact navigates at block 528. This processing may recursively be performed for each such detected navigation.

In response to documenting the breadcrumb of each hypertext link of any sub-page selected by the social network contact as the social network contact navigates at block 528, or in response to determining at decision point 526 that further navigation has not been detected in association with the user (any user) for which the content summary has been created, the process 500 makes a determination at decision point 530 as to whether any annotation of a social network contact has been selected by another social network contact (e.g., to initiate contemporaneous social browsing with the annotated social network contact). As such, the process 500 may detect a selection, by another one of the social network contacts to which the generated content summary is provided, of one of a rendered photograph/annotation (of the social network contact that selected the hypertext link rendered in association with the generated content summary) or a summarized hypertext link that represents the captured portion of the information content associated with the web page accessed by the selected hypertext link.

In response to determining at decision point 530 that an annotation of a social network contact has been selected by another social network contact, the process 500 navigates the combined live search results view associated with the other one of the social network contacts that selected the annotation rendered in association with the generated content summary (e.g., the photograph or the summarized hypertext link) to a specific sub-page of a website that the other social network contact that first selected the hypertext link is currently viewing at block 532. At block 534, the process 500 highlights any documented breadcrumbs of an initial social network contact to annotate selections of the initial social network contact. For example, the process 500 may highlight, as a breadcrumb within the specific sub-page of the website, at least one additional hypertext link that the other social network contact that first selected the hypertext link has also selected within the specific sub-page of the website (as documented in association with block 526 as described above). At block 536, the process 500 annotates, within partitions of the multiple social network contacts that are contemporaneously accessing the same web page, with a contemporaneous browsing indicator, as described above in association with FIG. 3D.

In response to annotating the respective partitions of the multiple social network contacts that are contemporaneously accessing the same web page with a contemporaneous browsing indicator at block 536, or in response to determining at decision point 530 that an annotation of a social network contact has not been selected by another social network contact, the process 500 makes a determination at decision point 538 as to whether the respective sub-processing associated with contemporaneous web site accesses has been completed. An affirmative determination at decision point 538 will be described in more detail further below.

In response to determining at decision point 538 that the respective sub-processing associated with contemporaneous web site accesses has not been completed, the process 500 makes a determination at decision point 540 as to whether to age any annotations. As described above, annotations may be aged by animation, such as size-based or resolution-based adjustments or changes to the respective annotations to indicate to other social network contacts that the respective search activities are no longer contemporaneous with the other social network contacts' current activities. Other users may still find the search results useful, though the other/inactive social network contact may have completed their respective research activities.

In response to determining at decision point 540 not to age any annotations, the process 500 returns to decision point 526 and iterates within the respective sub-processing associated with contemporaneous web site accesses, as described above. In response to determining at decision point 540 to age any annotations, the process 500 adjusts at least one of size and resolution of the respective annotation(s) in response to inactivity within the combined live search results view associated with the respective social network contacts at block 542.

The process 500 returns to decision point 538 to determine whether the respective sub-processing associated with contemporaneous web site accesses has been completed. In response to determining at decision point 538 that the respective sub-processing associated with contemporaneous web site accesses has been completed, the process 500 returns to the processing described in association with FIG. 5A at decision point 514 and iterates as described above.

It should be noted that while particular example processing has been shown and described in association with the process 500, other variations of sequences of operations may be utilized as appropriate for a given implementation. As such, the process 500 is not to be considered limiting with respect to sequences of processing or sub-processing tasks. For example, the determinations as to whether to age an annotation described in association with the decision point 540 may alternatively be performed outside of the respective sub-processing at a higher level within the process 500. This processing has been described at this location as a matter of convenience for presentation and due to limitations of page size within the respective drawing views.

Additionally, a navigation sharing configuration option may be configured by individual social network users that controls whether they are interested in contributing to/participating in temporary navigation social sub-networks, and to granularly configure what, if any, browsing activities are shared by the respective social network users with other social network users. Further, a social web-browsing activity log may be captured by the process 500 and made available to document shared research activities, as described above. Many other variations are possible and all such variations are considered to be within the scope of the present subject matter.

As such, the process 500 detects opportunities to create temporary/ad hoc navigation social sub-networks, and forms temporary/ad hoc navigation social sub-networks of social network contacts to provide contemporaneous web browsing for the social network contacts. Summaries of navigation efforts by social network contacts within the temporary/ad hoc navigation social sub-networks are created and provided to other social network contacts. Social network contacts may view the content summaries to determine whether they are also interested in the respective browsing activities of the other social network contacts. If of interest, the social network contacts may select annotations associated with the other social network contact(s) to invoke contemporaneous browsing of the same accessed web sites. Annotations may be aged to represent the non-contemporaneous nature of search results or content summaries, while still providing access to research performed by other social network contacts within the temporary/ad hoc navigation social sub-networks.

As described above in association with FIG. 1 through FIG. 5B, the example systems and processes provide real-time shared web browsing among social network contacts. Many other variations and additional activities associated with real-time shared web browsing among social network contacts are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   an output module; and
   a processor programmed to:
      determine that at least two social network contacts involved in a social messaging interaction each initiate a separate web search associated with the social messaging interaction;
      capture, in association with each initiated separate web search, a separate set of web search results returned to each of the at least two social network contacts; and
      provide, via the output module, to each of the at least two social network contacts, a combined live search results view comprising each captured separate set of web search results, where the combined live search results view provides navigation to web content returned to other social network contacts.

2. The system of claim 1, where the processor is further programmed to:
   detect a selection by one of the at least two social network contacts of a web search result hypertext link of one of the web search results returned to the respective one of the at least two social network contacts;
   capture a portion of information content associated with a web page accessed by the selected hypertext link;
   generate a content summary that represents the captured portion of the information content associated with the web page accessed by the selected hypertext link, where the content summary comprises a summarized text phrase as a summarized hypertext link and a content text summary that describes the captured portion of the information content associated with the web page accessed by the selected hypertext link; and
   update the combined live search results view provided to other social network contacts with the generated content summary within a respective separate partition of the combined live search results view associated with the respective one of the at least two social network contacts that first selected the hypertext link.

3. The system of claim 2, where the processor is further programmed to:
   detect a selection by another one of the at least two social network contacts, to which the generated content summary is provided, of a rendered selectable annotation associated with the generated content summary, where the rendered selectable annotation comprises one of a rendered photograph of the one of the at least two social network contacts that first selected the hypertext link rendered in association with the generated content summary, and a summarized hypertext link that represents the captured portion of the information content associated with the web page accessed by the selected hypertext link; and
   navigate the combined live search results view associated with the other one of the at least two social network contacts that selected the rendered selectable annotation to a specific sub-page of a website that the one of the at least two social network contacts that first selected the hypertext link is currently viewing.

4. The system of claim 3, where the processor is further programmed to highlight as a breadcrumb within the specific sub-page of the website at least one additional hypertext link that the one of the at least two social network contacts that first selected the hypertext link also selected within the specific sub-page of the website.

5. The system of claim 1, where, in being programmed to provide, via the output module, to each of the at least two social network contacts, the combined live search results view comprising each captured separate set of web search results, the processor is programmed to:
   provide, for each social network contact, a separate browser content partition within a unified content panel of the combined live search results view; and
   provide the captured web search results returned to the at least two social network contacts within the respective separate browser content partitions provided for the respective social network contacts.

6. The system of claim 1, where the social messaging interaction is selected from a group consisting of a chat session messaging interaction, an instant messaging interaction, an email messaging interaction, and a social network messaging interaction.

7. A computer program product, comprising:
   a computer readable storage medium having computer readable program code embodied therewith, where the computer readable program code when executed on a computer causes the computer to:
      determine that at least two social network contacts involved in a social messaging interaction each initiate a separate web search associated with the social messaging interaction;
      capture, in association with each initiated separate web search, a separate set of web search results returned to each of the at least two social network contacts; and
      provide, to each of the at least two social network contacts, a combined live search results view comprising each captured separate set of web search results, where the combined live search results view provides navigation to web content returned to other social network contacts.

8. The computer program product of claim 7, where the computer readable program code when executed on the computer further causes the computer to:

detect a selection by one of the at least two social network contacts of a web search result hypertext link of one of the web search results returned to the respective one of the at least two social network contacts;

capture a portion of information content associated with a web page accessed by the selected hypertext link;

generate a content summary that represents the captured portion of the information content associated with the web page accessed by the selected hypertext link, where the content summary comprises a summarized text phrase as a summarized hypertext link and a content text summary that describes the captured portion of the information content associated with the web page accessed by the selected hypertext link; and update the combined live search results view provided to other social network contacts with the generated content summary within a respective separate partition of the combined live search results view associated with the respective one of the at least two social network contacts that first selected the hypertext link.

9. The computer program product of claim 8, where the computer readable program code when executed on the computer further causes the computer to:

detect a selection by another one of the at least two social network contacts, to which the generated content summary is provided, of a rendered selectable annotation associated with the generated content summary, where the rendered selectable annotation comprises one of a rendered photograph of the one of the at least two social network contacts that first selected the hypertext link rendered in association with the generated content summary, and a summarized hypertext link that represents the captured portion of the information content associated with the web page accessed by the selected hypertext link; and navigate the combined live search results view associated with the other one of the at least two social network contacts that selected the rendered selectable annotation to a specific sub-page of a website that the one of the at least two social network contacts that first selected the hypertext link is currently viewing.

10. The computer program product of claim 9, where the computer readable program code when executed on the computer further causes the computer to highlight as a breadcrumb within the specific sub-page of the website at least one additional hypertext link that the one of the at least two social network contacts that first selected the hypertext link also selected within the specific sub-page of the website.

11. The computer program product of claim 7, where, in causing the computer to provide, to each of the at least two social network contacts, the combined live search results view comprising each captured separate set of web search results, the computer readable program code when executed on the computer causes the computer to:

provide, for each social network contact, a separate browser content partition within a unified content panel of the combined live search results view; and provide the captured web search results returned to the at least two social network contacts within the respective separate browser content partitions provided for the respective social network contacts.

12. The computer program product of claim 7, where the social messaging interaction is selected from a group consisting of a chat session messaging interaction, an instant messaging interaction, an email messaging interaction, and a social network messaging interaction.

* * * * *